Dec. 5, 1944.   B. G. CARLSON   2,364,128
AIRCRAFT CONTROL DEVICE
Filed April 22, 1942   3 Sheets-Sheet 3

INVENTOR.
BERT G. CARLSON.
BY
Frank H. Harmon
ATTORNEY.

Patented Dec. 5, 1944

2,364,128

UNITED STATES PATENT OFFICE 2,364,128

AIRCRAFT CONTROL DEVICE

Bert G. Carlson, Erieside, Ohio, assignor to Jack & Heintz, Inc., Bedford, Ohio, a corporation of Ohio Application April 22, 1942, Serial No. 440,001

7 Claims. (Cl. 244—78)

This invention relates in general to automatic pilots for aircraft and more particularly to an automatic control for the amount and rate of elevator operation.

In the conventional hydraulic automatic pilot the gyro is air spun and its precession movements are transmitted through an air operated relay to the hydraulic system and to the aircraft control surfaces. One of the disadvantages of the conventional system, with respect more particularly to elevator control, is the tendency of the automatic pilot toward over control as the aircraft pitches in normal straightaway flight. Another disadvantage is the difficulty encountered in automatic maintenance of a desired flight altitude.

An object of this invention is to provide a means whereby the amount of elevator applied will vary directly with the rate at which the aircraft pitches and to provide a combined amount and rate follow-up system that will minimize or eliminate over controlling of the elevator and to reduce the cable loads as well as amount of pitch.

Another object is to provide a simple barometrically responsive control system whereby a desired flight altitude may be manually set, obtained and maintained in spite of the usual tendency for the automatic pilot to correct for pitch by changing the fore and aft attitude which would interfere with the maintenance of a given flight altitude, all without over-control of the elevators due to sudden tendencies toward pitching.

According to the present invention there are provided two conventional air spun horizon gyros, one for bank control and one for pitch control, and one air spun directional gyro and air relays to take charge of the elevator, aileron and rudder hydraulic servos for normal straightaway flight. Interjected into the hydraulic system is an oil spun gyro with its own balanced oil valve. The oil spun gyro is sufficiently spring loaded so for normal straightaway flight it does not precess or interfere with the conventional ones operated by the air relay diaphragms. However, for purposes of controlling the amount and rate of a turn, when the oil is shut off from the air relay operated balanced oil valves, the balanced oil valve of the oil spun gyro regulates flow of oil to the servo motors and consequently takes charge of the operation of the rudder and aileron to the exclusion of the balanced oil valves that are operated by the air relays.

For the operation of the ailerons an air spun horizon gyro is used to operate an air relay, which in turn operates a balanced oil valve regulating the flow of pressure oil to the aileron servo cylinder. Interposed between this oil valve and the aileron servo is a spring balanced piston in each of the two oil pipe lines which are in circuit with the hydraulic system as a whole.

In straightaway flight the damped pendulum of the horizon gyro compensates for any gyro precession caused by acceleration which would apply aileron and put a wing down. In turns this pendulum applies aileron to speed the recovery from violent yaws. In automatic turns it applies aileron simultaneously with or slightly in advance of, rudder application and the amount of aileron applied varies with the rudder load and the correct angle of bank.

Insofar as that part of the automatic pilot that automatically controls the operation of the elevators is concerned, the same air spun horizon gyro that controls the ailerons may be used. However, in the present invention a separate gyro is used for the elevator. In other words, one horizon gyro, or one that spins on a vertical axis may be used for aileron control and the air pick-off so arranged as to compensate for precession in response to banking. An additional air spun vertical axis air spun horizon gyro is used for elevator control and provided with air pick-offs so arranged as to compensate for precession in response to pitch. In addition to the conventional air relay and balanced oil valve for operation of the elevator servo motor, there is also an added balanced oil valve in the hydraulic system that is under the control of, and regulated by, a barometrically responsive bellows that is calibrated and manually adjustable for desired flight altitudes.

The manual control system for the automatic pilot comprises five control knobs, one of which centralizes the gyro indicators before engaging the automatic pilot, one of which controls the operation of the conventional part of the automatic pilot for the rudder and aileron directional and horizon gyros, one of which is used to change altitude with its dial calibrated in feet altitude, one of which shuts off and on the flow of oil supply to the main balanced oil valve in the hydraulic circuit, and one which regulates the rate of turn through the oil spun gyro and its associated balanced oil valve to the rudder and aileron servo motors.

With the foregoing and other objects in view, the invention consists in the combination of parts and in the details of construction hereinafter set forth in the following specification and appended claims, certain embodiments thereof being illustrated in the accompanying drawings, in which:

Figure 1:
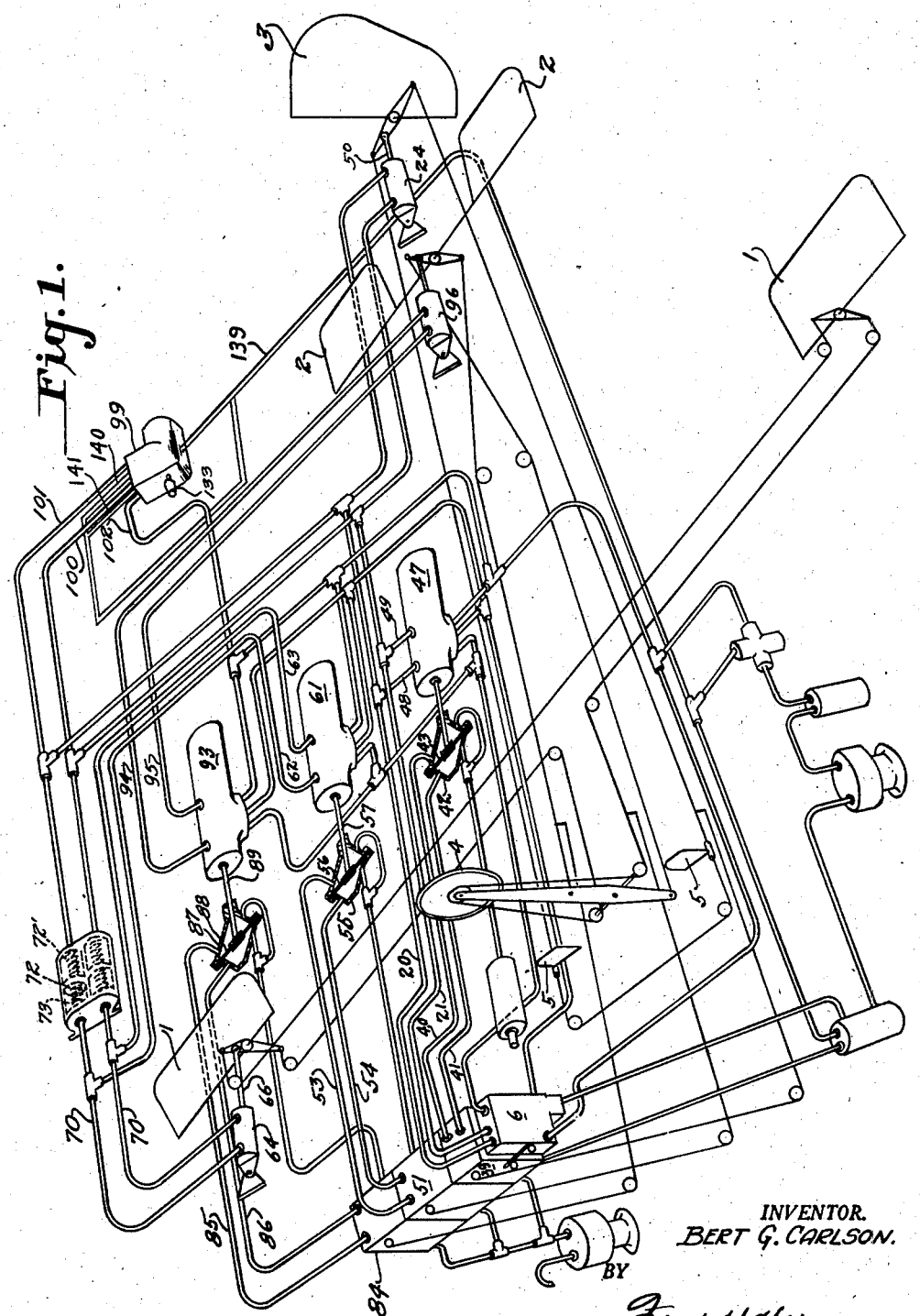
Figure 1 is a schematic view of the control system as applied to the aircraft control surfaces.

Referring more particularly to the drawings, Figure 1 shows the conventional arrangement of aircraft ailerons 1, elevators 2 and rudder 3 as well as the manual wheel control 4 and associated cables for operating the ailerons and elevators and the conventional rudder pedals 5 and associated cables for operating the rudder.

As stated before, the present invention is more particularly directed to improvements in amount and rate of rudder control and corresponding aileron control for stability and automatic turns and, as far as structure is concerned, it mainly comprises the addition into an air relay controlled hydraulic system for rudder and aileron control of an oil spun gyro for controlling a balanced oil valve regulating flow of pressure oil to the rudder servo cylinder and a rudder assistor, or oil pressure member, for regulating operation of the aileron servo in accordance with rudder operation in addition to the conventional air relay controlled balanced oil valves regulating flow of oil to the rudder and aileron servo cylinder.

Figure 2:
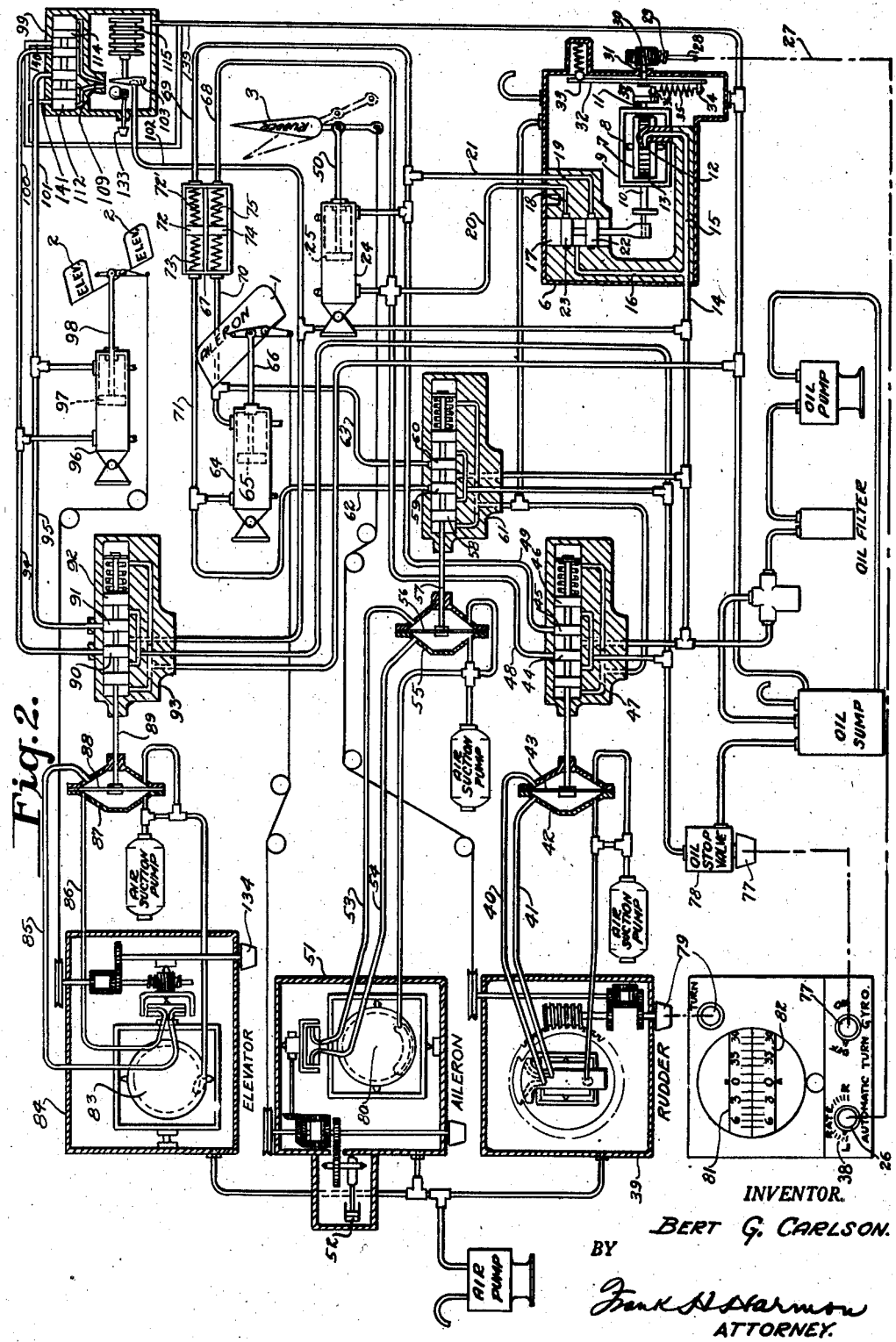
Figure 2 is a schematic view of the control system showing certain parts for elevators, ailerons and rudder control in transverse section.

As shown in Figure 2, the oil spun gyro assembly includes a casing 6 and a directional type of gyro rotor 7 mounted on horizontal pivots 8 in a gimbal 9 to form a spinning axis corresponding normally to the longitudinal axis of the aircraft. The gimbal 9 is provided with trunnions 10 and 11 for rotation in suitable bearings in the casing. An oil jet 12 discharges oil under pressure to gyro wheel buckets 13 to spin the wheel. An oil supply pipe 14 leads into the casing and through the passageway 15 to the oil jet 12 and through passageway 16 to cylinder 17. The passageways 18 and 19 leading to pipes 20 and 21 are opened and closed by pistons 22 and 23. The furnishing of oil under pressure through pipe 20 or 21 into a hydraulic servo cylinder 24 on either side of the piston 25 causes oil to be forced out of the cylinder on the other side of the piston and out through the corresponding other pipe and causes a movement of the rudder 3 in the corresponding direction. In the position shown in Figure 2 both passages 18 and 19 are closed by pistons 22 and 23.

Operation of the "rate" knob 26, through appropriate shafting represented in dot and dash line 27 effects a rotation of shaft 28 and its worm 29 engaging a worm wheel 30 carried by a shaft 31 mounted in suitable bearings in casing 6. Shaft 31 carries a segmental plate 32 fixed thereto which is provided with appropriate recesses to be engaged by a fixed spring detent 33 so as to resiliently maintain the plate in various adjusted positions. The plate 32 has fixed thereto an arm 34 to receive one end of a tension coil spring 35 whose other end is secured to a pin 36 of a crank 37 keyed to the gimbal trunnion 11. Thus an adjustment of control knob 26 effects a spring loaded biasing of the gimbal and its rotor, which in this case is only mounted for two degrees of freedom, either to the left or right and to a predetermined degree as indicated by the control knob dial 38.

For normal straightaway flight the conventional air spun gyro and air relay controlled balanced oil valve is used for operating the rudder servo. The air spun gyro assembly in the casing 39 includes any suitable air spun gyro of the directional type and any suitable air pick off for leading air under pressure through tube 40 or 41 to the air relay 42 on either side of the diaphragm 43 for the actuation of the balanced oil valve 44, 45, 46 in casing 47 for regulating flow of pressure oil through pipe 48 or 49 to the hydraulic servo cylinder 24 to either side of the piston 25 for operating the rudder 3 through the piston rod 50 in either direction.

The air spun horizon gyro assembly in casing 51 includes a damped pendulum 52 for compensating for precession of the gyro by reason of acceleration. As is conventional, the air tubes 53 and 54 lead to an air relay 55 to either side of a diaphragm 56 connected to a piston rod 57 for operating pistons 58, 59 and 60 of the balanced oil valve in casing 61. Also the pistons in this balanced oil valve regulate the flow of pressure oil through pipes 62 and 63 to the aileron servo cylinder 64 to operate the aileron 1 in either direction through piston rod 66.

Arranged between pipes 20 and 21 and pipes 62 and 63 is a rudder assistor in a casing 67 with pipes 68 and 69 leading to pipes 20 and 21 and with pipes 70 and 71 leading to pipes 62 and 63.

The rudder assistor is actually for operating the ailerons and comprises a cylinder to receive a piston 72 spring pressed to the right by a compression coil spring 73 and to the left by a compression coil spring 72' so as to be balanced. As shown the cylinder in which a corresponding piston 74 is located and balanced by springs 75 and 76, is in communication with pipes 69 and 71.

When it is desired to make an ordinary turn with the conventional part of the automatic pilot, without using the oil spun gyro assembly and without regard to predetermining the rate of turn, the knob 77 is left in the "off" position leaving the oil stop valve 78 open for distribution of pressure oil to the balanced oil valve in casing 47. Turning of knob 79 through conventional gearing as shown in Figure 2, biases the air spun directional gyro assembly in casing 39 and the horizon gyro assembly for operation of the rudder and ailerons.

It will be seen, that despite the previously described spring loading of the oil spun gyro in the casing 6, if an abnormal yaw occurs and if there is any tendency toward overcontrol by the rudder, the oil spun gyro assembly will temporarily overcome its spring loading and take charge to eliminate such over control. In this manner the amount of rudder applied varies directly with the rate at which the aircraft yaws off course and the combined amount and rate follow-up eliminates over control. The damped pendulum 52 compensates for any precession of the horizon gyro 80 caused by acceleration which would apply aileron and put a wing down. In turns this pendulum applies ailerons to maintain the correct amount of bank.

In operation for automatic turns the control knob 134 is turned to centralize the gyro indicators before engaging the automatic pilot. The control knob 77 is then turned to "on" position which through the oil stop valve 78 shuts off the supply of oil to the main balanced oil valves in casings 47 and 61. The control knob 79 is then rotated until the top compass card 81 indicates in calibrated degrees the heading of the new course to be flown. The control knob 26 is then turned, to the left or right as required, to index 38 denoting the rate of turn desired. As previously explained the turning of knob 26, through shafting 27, 28 puts the oil spun gyro 7 under flexible bias through spring 35 and consequently the balanced oil valve 22, 23 regulates the flow of oil to either side of the piston 25 in the rudder servo cylinder 24. The turn thus initiated will continue until the "off-on" control knob 77 is turned to "off" position and the "rate" control knob 26 is turned to zero position. In other words, the fixed rate of turn will continue as long as called for. Knob 77 should be turned to "off" position and knob 26 should be returned to zero position within 30 degres, plus or minus spread of the two compass cards 81 and 82 in order to straighten out on the compass heading set for 10 to 15 degrees in advance on approaching a course originally set to avoid over run. If this spread has been exceeded the control knob 26 should be turned hard over, in the corresponding direction, and returned to zero position when the compass cards 81 and 82 approach alignment within the 60 degree spread.

As the pressure oil from pipes 20 and 21 deliver oil under greater pressure either to the left or right of piston 25 in the rudder servo cylinder 24 to apply left or right rudder a corresponding greater oil pressure is applied through pipe 69 or 68 to piston 74 in the rudder assistor. Should the oil pressure in pipe 69 be greater than that in pipe 68, the pressure of the column of oil on valve 72 plus the expansive force of spring 72' overcomes the balancing action of compression spring 73 and thus valve 72 is forced from right to left. This creates an added pressure on the column of oil in pipe 71 and to the left side of piston 65 in the aileron servo cylinder 64 and through piston rod 66 the ailerons 1 are moved in the corresponding direction as the rudder in order to assist the rudder in the automatic turn by properly banking the aircraft. As a matter of fact the action of the rudder assistor in effecting aileron control slightly precedes the initiation and completion of the rudder control for such automatic turns so as to insure proper bank and turn and eliminate any tendency for the aircraft to skid. It, of course, follows that control of the rudder in the opposite direction brings piston 74 of the rudder assistor into action to correspondingly effect an appropriate aileron control.

For purposes of elevator control by the automatic pilot a separate horizon gyro may be employed and so provided with air pick offs that it will function only as a climb gyro. Such a gyro is shown at 83 enclosed in a casing 84 with tubes 85 and 86 leading from the air pick off to the air relay 87 on either side of the diaphragm 88 which through its connection through piston rod 89 operates the balanced oil valves 90, 91 and 92 in the casing 93. The pressure oil from the balanced oil valve in casing 93 leads through tubes 94 and 95 to the elevator servo cylinder 96 on either side of servo piston 97 which is connected through piston rod 98 to the elevators 2 to operate the same in the corresponding direction.

In order to regulate the amount and rate of elevator control there is provided an additional balanced oil valve in casing 99 with pipes 100 and 101 leading to either side of servo piston 97. The supply of oil for hollow vane 103 in casing 93 comes from the oil pump through tube 102, casing 93 being provided with a drain outlet and tube 139 leading to the oil sump. Vane 103 is provided with a hollow axis 104 which registers with pipe 102 and the vane and its hollow interior taper upwardly to its upper end to form a nozzle 105. Vane 103 is counterweighted by an adjustable counterweight 122. Above and adjacent to the nozzle is a bracket 106 divided into two upwardly widening passages 107 and 108 with a tapering knife edge partition 109 between the same. These passages communicate with passages 110 and 111 in the casing leading into either end of the cylinder 112. In this cylinder are arranged pistons 113 and 114 to regulate the passage of pressure oil from the cylinder to either pipe 100 or 101 to the elevator servo cylinder 96, the excess oil from passages 110 and 111 falling to the bottom of casing 99 and draining out through tube 139 to the sump. The oil for operating servo piston comes from tubes 102b and 102a into either tube 100 or 101. The servo housing 99 is provided with two outlet tubes 140 and 141 communicating with tube 139 leading to the sump so that when oil goes to one of tubes 100 or 101 it is allowed to escape through the other through outlets 140 or 141 to drain pipe 139 to the sump.

Figure 3:
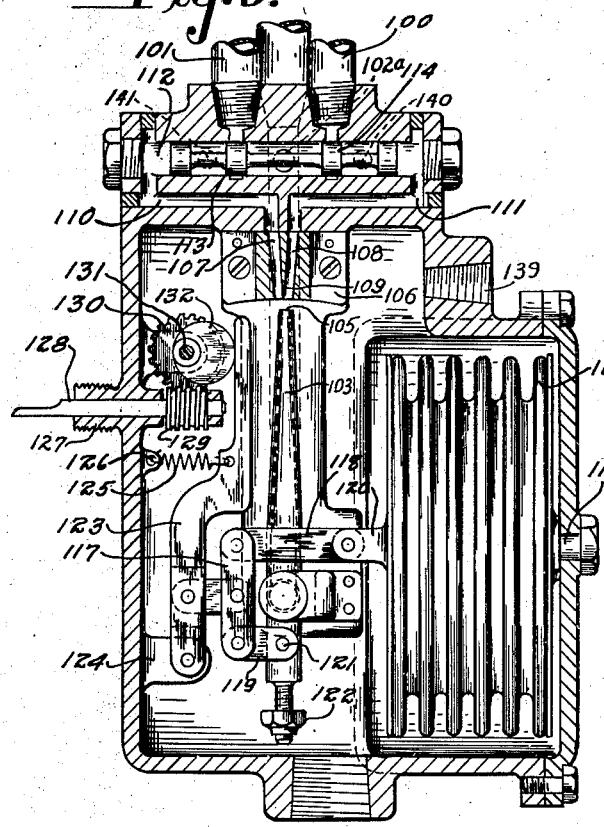
Figure 3 is a view in longitudinal section taken through the barometrically responsive automatic altitude control for the elevators.
Figure 4:
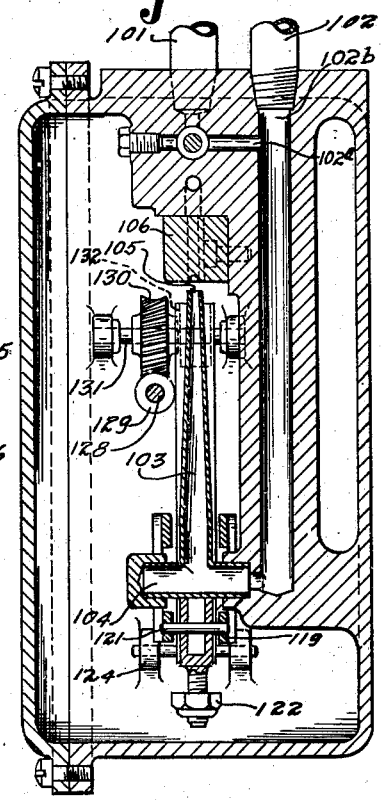
Figure 4 is a view in longitudinal section taken at right angles to Figure 3.
Figure 5:
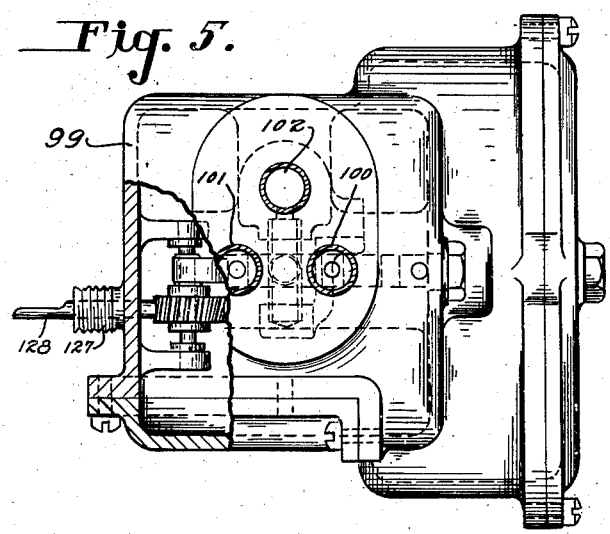
Figure 5 is a view in elevation of the barometric elevator control with a portion of the cover plate removed.

Also installed within the casing 99 is a barometrically responsive bellows 115 secured at 116 to the casing. Through the medium of a toggle joint including pivotally connected links 117, 118 and 119 the bellows bracket 120 is connected pivotally at 121 to pivoted vane 103 below its pivotal axis 104. Thus as the bellows expands or contracts in response to variations in barometric pressures this movement of the bellows is translated through the toggle mechanism to the vane 103 which is rotated about its pivot accordingly. As long as the vane and its nozzle 105 is in neutral position as shown in Figure 3 and on dead center with respect to the knife edge partition 109 an equal amount of pressure oil is distributed to either end of cylinder 112 and the oil valve assembly is balanced and no pressure is added through pipes 100 or 101 to the elevator servo cylinder. When, however, the bellows contracts or expands and the vane nozzle is moved to the left or right an unequal pressure resulting unbalances the oil valve causing the servo piston to move to the left or right and depress or elevate the elevators to cause a shift of attitude of the aircraft to ascending or descending position.

In order to render the manual adjustment of vane 103 possible, an arm 123 is pivoted to a casing bracket 124 and carries a link pivoted to arm 123 and line 117 of the toggle. This arm 123 has connected thereto a tension coil spring 125 which is also connected to a casing bracket 126. Extending through the casing in a suitable bearing sleeve 127 is a shaft 128 that carries a worm gear 129 meshing with a worm wheel 130 carried by a shaft 131. This shaft 131 also has fixed thereto a cam 132 that bears against arm 123. The shaft 131 extends to a knob 133 for manual setting of the nozzle 105 with respect to the passages 107 and 108 of the hydraulic valve assembly.

In operation the knob 134 is used to centralize the gyro indicators before engaging the automatic pilot. The control knob 133 is used to change altitude in that an adjustment of the vane nozzle 105 to the left or right of dead center position will vary the pressure in either end of the hydraulic valve assembly and cause the elevator to change the attitude of the aircraft either upwardly or downwardly about its transverse axis. When the desired altitude has been reached the expansion or contraction of the barometric bellows existing at the manually set altitude operates the toggle to bring the vane nozzle once again in dead center position to balance the hydraulic valve. In straight flight and in turns the barometric pressure controls the hydraulic valve which operates to attain and maintain the desired altitude. This is also true when the conventional part of the automatic pilot might otherwise tend toward over-control as a result of gusts or shifts in center of gravity to ascend above or descend below the desired flight altitude.

From the foregoing, it will be seen that there has been provided an automatic pilot system wherein the amount of rudder applied will vary directly with the rate at which the aircraft yaws off course and wherein the combined amount and rate follow-up will eliminate over control.

It will also be seen that there has been provided an aileron control, in the form of a rudder assistor, in which a damped pendulum for the horizon gyro compensates for any gyro precession caused by acceleration which would apply aileron. In turns this pendulum applies aileron to maintain the correct amount of bank. The rudder assistor applies aileron to speed recovery from violent yaws and in automatic turns it applies aileron simultaneously with, or slightly prior to, rudder application and the amount of aileron applied varies with the rudder load and the correct angle of bank.

The oil spun gyro assembly and balanced oil valve and rudder assistor, or aileron control, controlled thereby under control of the "rate" knob effectively brings about a controlled operation of rudder and ailerons together and a consequent controlled rate of turn and may be readily installed as a unit in the hydraulic system of any conventional hydraulic automatic pilot.

The automatic barometric amount and rate of elevator control makes it easily possible to attain and maintain a desired flight altitude despite tendencies of the aircraft to pitch as a result of gusts and airpockets and shifts of center of gravity which might tend toward overcontrol and loss of continued flight altitude level in the conventional automatic pilot elevator control.

I claim:

1. In an automatic pilot for aircraft, the combination with a gyroscopic precession responsive hydraulic system having a balanced oil valve and piston operated elevator servo motor for maintaining the proper aircraft attitude in elevation, of supplemental means for maintaining level flight and predetermining and regulating aircraft ascent and descent, said means including a supplemental pressure oil line in said hydraulic system leading to said servo motor, a balanced oil valve in said line, a barometric means, a control device operated thereby for operating said valve and said servo motor in either direction and alternate manual means for operating said barometric means and said servo motor in either direction, said control device comprising a pivoted nozzle in said pressure oil line arranged when in neutral position to deliver equal pressure oil to both ends of said last-named oil valve to balance the same, said nozzle being connected to said barometric means so as to be automatically operated thereby in response to barometric conditions so as to maintain flight level attitudes.

2. In an automatic pilot for aircraft, the combination with a gyroscopic precession responsive hydraulic system having a balanced oil valve and piston operated elevator servo motor for maintaining the proper aircraft attitude in elevation, of supplemental means for maintaining level flight and predetermining and regulating aircraft ascent and descent, said means including a supplemental pressure oil line in said hydraulic system leading to said servo motor, a balanced oil valve in said line, a barometric means, a control device operated thereby for operating said valve and said servo motor in either direction and alternate manual means for operating said barometric means and said servo motor in either direction, said control device comprising a pivoted nozzle in said pressure oil line arranged when in neutral position to deliver equal pressure oil to both ends of said last-named oil valve to balance the same, said nozzle being connected to said barometric means so as to be automatically operated thereby in response to barometric conditions so as to maintain flight level attitudes, said alternate manual control means being adapted to bias said nozzle to one side or the other away from neutral to predeterminedly set and attain a given flight altitude either by ascent or descent.

3. In an automatic pilot for aircraft, the combination with a gyroscopic precession responsive hydraulic system having a balanced oil valve and piston operated elevator servo motor for maintaining the proper aircraft attitude in elevation, of supplemental means for maintaining level flight and predetermining and regulating aircraft ascent and descent, said supplemental means including a supplemental pressure oil line in said hydraulic system, oil lines leading to either side of said servo piston, a balanced oil valve in said oil line for controlling the delivery of pressure oil to said servo motor oil lines to operate said servo piston in either direction, inlet passages for delivering pressure oil to either side of said last-named balanced oil valve, a pivoted hollow vane in said oil line and adapted when in neutral position for delivering equalized pressure oil to said inlet passages, a barometric responsive device connected to said vane for controlling the relation of its outlet with respect to said neutral position, and to create a differential in pressure within said last-named balanced oil valve when deviated from said neutral position in either direction.

4. In an automatic pilot for aircraft, the combination with a gyroscopic precession responsive hydraulic system having a balanced oil valve and piston operated elevator servo motor for maintaining the proper aircraft attitude in elevation, of supplemental means for maintaining level flight and predetermining and regulating aircraft ascent and descent, said supplemental means including a supplemental pressure oil line in said hydraulic system, oil leads to either side of said servo piston, a balanced oil valve in said oil line for controlling the delivery of pressure oil to said servo motor oil leads to operate said servo piston in either direction, inlet passages for delivering pressure oil to either side of said last-named balanced oil valve, stationary means for equally dividing said inlet passages, a pivoted hollow vane in said oil line for delivering pressure oil to said inlet passages, a barometric responsive device connected to said vane for controlling the relation of its outlet with respect to said stationary inlet dividing means so as to deliver equal quantities of pressure oil to both of said inlets when in neutral position with respect to said dividing means, and to create a differential in pressure within said last-named balanced oil valve when deviated from said neutral position in either direction.

5. In an automatic pilot for aircraft, the combination with a gyroscopic precession responsive hydraulic system having a balanced oil valve and piston operated elevator servo motor for maintaining the proper aircraft attitude in elevation, of supplemental means for maintaining level flight and predetermining and regulating aircraft ascent and descent, said supplemental means including a supplemental pressure oil line in said hydraulic system, oil lines leading to either side of said servo piston, a balanced oil valve in said oil line for controlling the delivery of pressure oil to said servo motor oil lines to operate said servo piston in either direction, inlet passages for delivering pressure oil to either side of said last-named balanced oil valve, a knife edge partition for dividing the passage of oil into said inlet passages, a pivoted hollow vane in said oil line for delivering pressure oil to said inlet passages, a barometric responsive device connected to said vane for controlling the relation of its outlet with respect to said partition so as to deliver equal quantities of pressure oil to both of said inlets when in neutral position with respect to said partition, and to create a differential in pressure within said last-named balanced oil valve when deviated from said neutral position in either direction.

6. In an automatic pilot for aircraft, the combination with a gyroscopic precession responsive hydraulic system having a balanced oil valve and piston operated elevator servo motor for maintaining the proper aircraft attitude in elevation, of supplemental means for maintaining level flight and predetermining and regulating aircraft ascent and descent, said supplemental means including a supplemental pressure oil line in said hydraulic system, oil lines leading to either side of said servo piston, a balanced oil valve in said oil line for controlling the delivery of pressure oil to said servo motor oil lines to operate said servo piston in either direction, inlet passages for delivering pressure oil to either side of said last-named balanced oil valve, a pivoted hollow vane in said oil line and adapted when in neutral position for delivering equalized pressure oil to said inlet passages, a barometric responsive device connected to said vane for controlling the relation of its outlet with respect to said neutral position, and to create a differential in pressure within said last-named balanced oil valve when deviated from said neutral position in either direction and alternate manual means for operating said barometric means and said servo motor in either direction.

7. In an automatic pilot for aircraft, the combination with a gyroscopic precession responsive hydraulic system having a balanced oil valve and piston operated elevator servo motor for maintaining the proper aircraft attitude in elevation, of supplemental means for maintaining level flight and predetermining and regulating aircraft ascent and descent, said supplemental means including a supplemental pressure oil line in said hydraulic system, oil lines leading to either side of said servo piston, a balanced oil valve in said oil line for controlling the delivery of pressure oil to said servo motor oil lines to operate said servo piston in either direction, inlet passages for delivering pressure oil to either side of said last-named balanced oil valve, a knife edge partition for dividing the passage of oil into said inlet passages, a pivoted hollow vane in said oil line for delivering pressure oil to said inlet passages, a barometric responsive device connected to said vane for controlling the relation of its outlet with respect to said partition so as to deliver equal quantities of pressure oil to both of said inlets when in neutral position with respect to said partition, and to create a differential in pressure within said last-named balanced oil valve when deviated from said neutral position in either direction and alternate manual means for operating said barometric means and said servo motor in either direction.

BERT G. CARLSON.